(12) United States Patent
Xia et al.

(10) Patent No.: US 7,577,257 B2
(45) Date of Patent: Aug. 18, 2009

(54) LARGE SCALE QUANTUM CRYPTOGRAPHIC KEY DISTRIBUTION NETWORK

(75) Inventors: Tiejun J. Xia, Richardson, TX (US); Glenn A. Wellbrock, Wylie, TX (US)

(73) Assignee: Verizon Services Operations, Inc., Basking Ridge, NJ (US)

( * ) Notice: Subject to any disclaimer, the term of this patent is extended or adjusted under 35 U.S.C. 154(b) by 124 days.

(21) Appl. No.: 11/614,711

(22) Filed: Dec. 21, 2006

(65) Prior Publication Data
US 2008/0152147 A1    Jun. 26, 2008

(51) Int. Cl.
*H04L 9/00*    (2006.01)
*H04L 9/08*    (2006.01)

(52) U.S. Cl. .................. 380/278; 380/277; 380/255; 380/256

(58) Field of Classification Search ............... None
See application file for complete search history.

(56) References Cited

U.S. PATENT DOCUMENTS

| | | | | |
|---|---|---|---|---|
| 5,568,301 | A * | 10/1996 | Tiemann et al. | 398/79 |
| 5,966,224 | A * | 10/1999 | Hughes et al. | 398/40 |
| 6,529,601 | B1 * | 3/2003 | Townsend | 380/256 |
| 6,748,083 | B2 * | 6/2004 | Hughes et al. | 380/278 |
| 6,895,091 | B1 * | 5/2005 | Elliott et al. | 380/278 |
| 7,236,597 | B2 * | 6/2007 | Elliott et al. | 380/263 |
| 7,248,695 | B1 * | 7/2007 | Beal et al. | 380/256 |
| 2004/0184603 | A1 * | 9/2004 | Pearson et al. | 380/28 |
| 2006/0179313 | A1 * | 8/2006 | Wang | 713/170 |
| 2006/0262876 | A1 * | 11/2006 | LaDue | 375/295 |

OTHER PUBLICATIONS

Long-distance quantum communication with entangled photons using satellite. Selected Topics in Quantum Electronics, IEEE Journal of Publication Date: Nov.-Dec. 2003 vol. 9, Issue: 6.*
Long-distance quantum cryptography with entangled photons; Anton Zeilinger Proc. SPIE, vol. 6780, 67800B (2007); DOI:10.1117/12.740268; Online Publication Date: Sep. 10, 2007.*
Synchronization of free-space quantum key distribution; Qing-Lin Wu Key Laboratory of Quantum Information, University of Science and Technology of China, Hefei 230026, China; Apr. 18, 2007.*

* cited by examiner

*Primary Examiner*—Syed A. Zia

(57) ABSTRACT

A space-based satellite device obtains one or more encryption key symbols. The satellite device transmits the one or more encryption key symbols to multiple nodes of a land-based network using quantum cryptographic mechanisms.

15 Claims, 15 Drawing Sheets

LARGE SCALE QUANTUM CRYPTOGRAPHIC KEY DISTRIBUTION NETWORK

BACKGROUND

Within the field of cryptography, it is well recognized that the strength of any cryptographic system depends, among other things, on the key distribution technique employed. For conventional encryption to be effective, such as a symmetric key system, two communicating parties must share the same key and that key must be protected from access by others. The key must, therefore, be distributed to each of the parties. For a party, Bob, to decrypt ciphertext encrypted by a party, Alice, Alice or a third party must distribute a copy of the key to Bob. This distribution process can be implemented in a number of conventional ways including the following: 1) Alice can select a key and physically deliver the key to Bob; 2) A third party can select a key and physically deliver the key to Alice and Bob; 3) If Alice and Bob both have an encrypted connection to a third party, the third party can deliver a key on the encrypted links to Alice and Bob; 4) If Alice and Bob have previously used an old key, Alice can transmit a new key to Bob by encrypting the new key with the old; or 5) Alice and Bob may agree on a shared key via a one-way mathematical algorithm, such Diffie-Helman key agreement.

All of these distribution methods are vulnerable to interception of the distributed key by an eavesdropper Eve, or by Eve "cracking" the supposedly one-way algorithm. Eve can eavesdrop and intercept or copy a distributed key and then subsequently decrypt any intercepted ciphertext that is sent between Bob and Alice. In existing cryptographic systems, this eavesdropping may go undetected, with the result being that any ciphertext sent between Bob and Alice is compromised.

To combat these inherent deficiencies in the key distribution process, researchers have developed a key distribution technique called quantum cryptography. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, like Eve, from copying or intercepting a key that has been distributed from Alice to Bob without a significant probability of Bob's or Alice's discovery of the eavesdropping.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As described herein, a secure encryption key distribution network is provided that uses both fiber based quantum cryptographic key distribution and satellite based quantum cryptographic key distribution for distributing encryption key symbols over large scale networks. The secure encryption key distribution network described herein integrates a land-based optical network with a satellite-based optical network for distributing encryption keys to any customer connected to the land-based optical network. The land-based optical network may include, for example, an optical fiber based network. A space-based or earth-orbit based satellite network, controlled by a key management system, may distribute encryption keys to land-based network nodes using quantum cryptographic techniques and free space links. The land-based network nodes may further distribute the encryption keys out to customer sites using, for example, fiber based quantum cryptographic key distribution. By combining satellite based quantum key distribution with land-based fiber quantum key distribution, secure end-to-end encryption may be achieved across large to very large scale networks.

Figure 1:
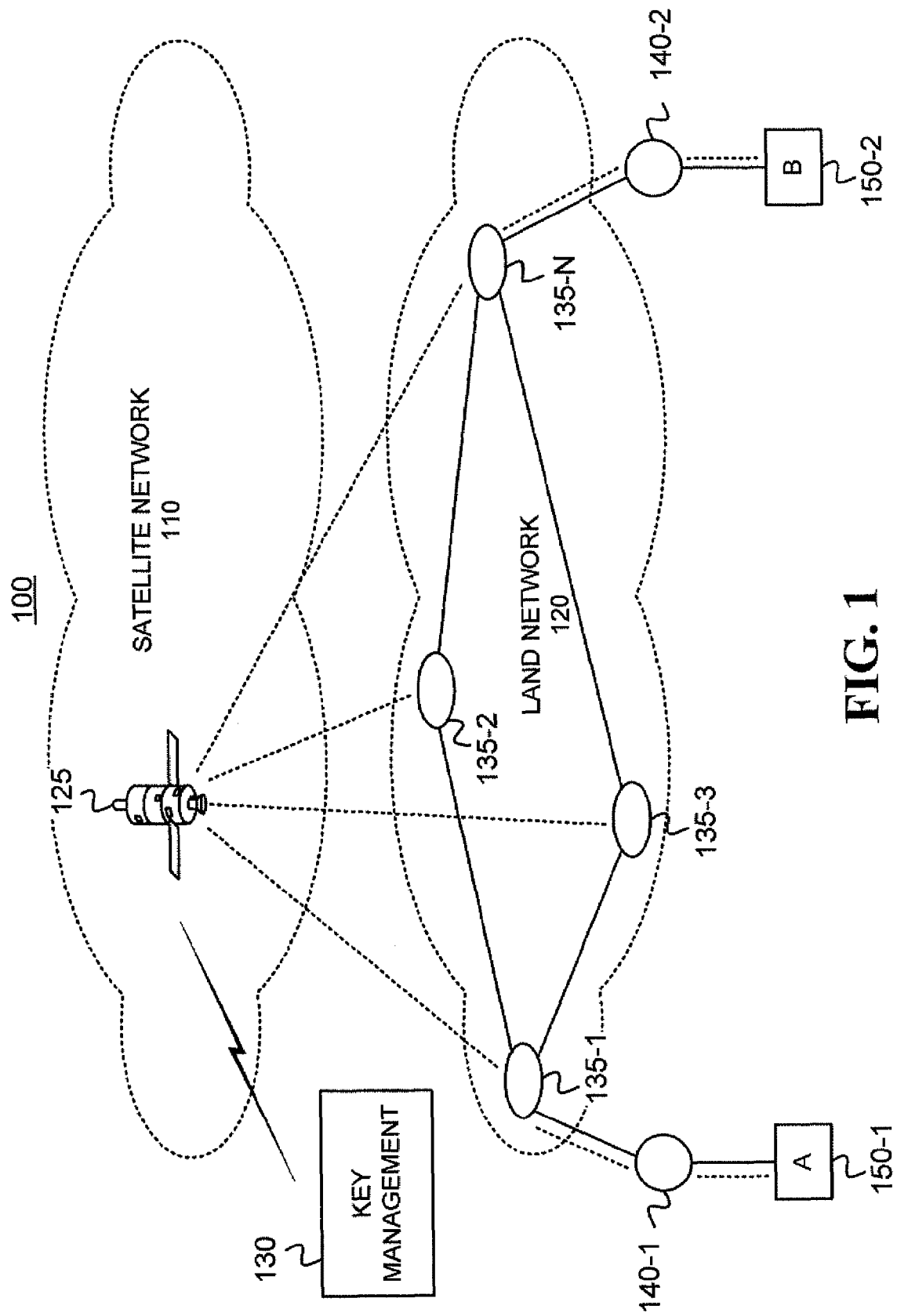
FIG. 1 is an exemplary diagram of a network in which systems and methods described herein may be implemented.

FIG. 1 is an exemplary diagram of a network 100 in which systems and methods described herein may be implemented. Network 100 may include a satellite network 110, a land network 120, a key management system 130, local nodes 140-1 and 140-2 and customer sites 150-1 and 150-2. Satellite network 110 may include any type of space-based or earth orbit based satellite network. Satellite network 110 may include one or more satellites, with a single satellite 125 being depicted in FIG. 1 for purposes of simplicity. Two local nodes 140-1 and 140-2 and customer sites 150-1 and 150-2 are shown in FIG. 1 for simplicity. Network 100, however, may include any number of local nodes 140 and customer sites 150.

Land Network 120 may include a land-based optical network for transmitting optical signals between customer sites 150-1 and 150-2. Land network 120 may include any type of network that may transmit optical signals, such as, for example, a Public Switched Telephone Network (PSTN). Land network 120 may include, for example, an optical fiber network. Land network 120 may include one or more network nodes 135-1 through 135-N. Each one of network nodes 135-1 through 135-N may include optical nodes (e.g., central offices) that interconnect with other of nodes 135-1 through 135-N via fiber links. Cascaded quantum key distribution may be used for distributing encryption keys between networks nodes 135-1 through 135-N. Local nodes 140-1 through 140-2 may include nodes for re-distributing keys out to one or more customer sites.

Land network 120 may be used for distributing encryption keys to customer sites 150-1 and 150-2. In some implementations, land network 120 may also be used for transmitting traffic sent between customer sites 150-1 and 150-2 using the distributed encryption keys. In other implementations, a separate network (not shown) may be used to transmit encrypted traffic sent between customer sites 150-1 and 150-2. Such a separate network may include, for example, a local area network (LAN), a wide area network (WAN), a metropolitan area network (MAN), a Public Land Mobile Network (PLMN), an intranet, the Internet, or a combination of networks. The PLMN may further include a packet-switched network, such as, for example, General Packet Radio Service (GPRS), Cellular Digital Packet Data (CDPD), or Mobile IP sub-network. Each of customer sites 150-1 and 150-2 may be moved from one physical location and re-connected to land network 120 at another physical location. New customer sites may be dynamically added or removed from land network 120.

Key management system 130 may send key distribution instructions via, for example, a radio-frequency (RF) link, to satellite 125. Satellite 125 may then, based on the instructions received from key management system 130, begin distributing encryption key symbols to selected ones of network nodes 135-1 through 135-N via, for example, free space links using quantum cryptographic techniques.

Distributed encryption key symbols received at network nodes (e.g., nodes 135-1 and 135-N) that are further connected to local nodes (e.g., local nodes 140-1 and 140-2) may then be further distributed out to the local nodes via, for example, fiber links using quantum cryptographic techniques. Distributed encryption key symbols received at local nodes (e.g., local nodes 140-1 and 140-2) may also be further distributed out to customer sites (e.g., customer sites 150-1 and 150-2) via, for example, fiber links, using quantum cryptographic techniques. Customer sites (e.g., customer sites 150-1 and 150-2) may then encrypt traffic sent between them using the distributed encryption key symbols.

Figure 2:
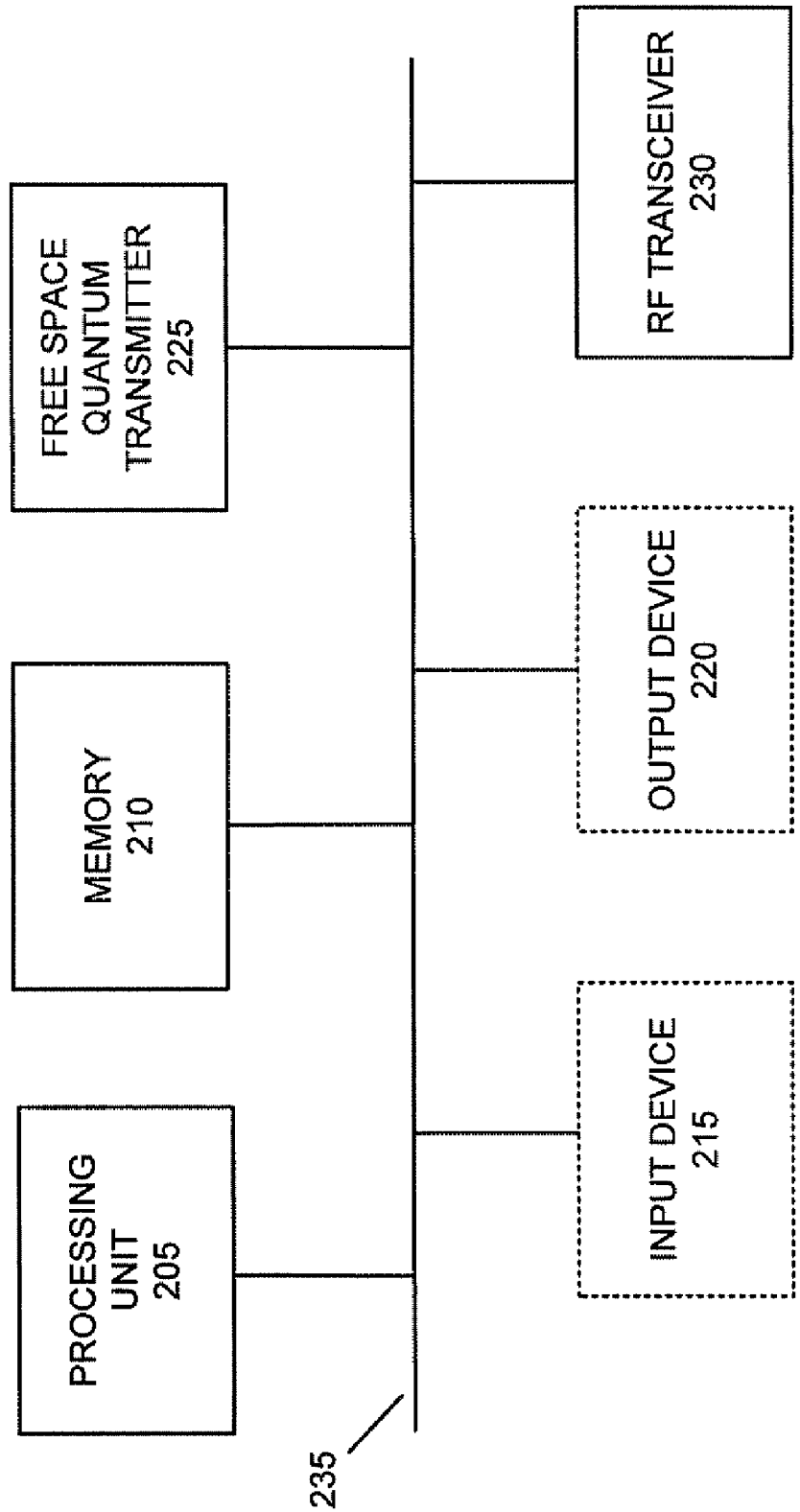
FIG. 2 is an exemplary diagram of a satellite of FIG. 1.

FIG. 2 is a diagram of an exemplary configuration of satellite 125. Satellite 125 may include a processing unit 205, a memory 210, an input device 215, an output device 220, a free space quantum transmitter 225, an RF transceiver 230 and a bus 235.

Processing unit 205 may include a processor, microprocessor, or processing logic that may interpret and execute instructions. Memory 210 may include a random access memory (RAM) or another type of dynamic storage device that may store information and instructions for execution by processing unit 205. Memory 210 may further include a ROM device or another type of static storage device that may store static information and instructions for use by processing unit 205.

Optional input device 215 may include a mechanism that permits an operator to input information to satellite 125, such as, for example, a keypad or a keyboard. Optional output device 220 may include a mechanism that outputs information to a satellite operator such as, for example, a display.

Free space quantum transmitter 225 may include components for distributing encryption key symbols via a free space link using quantum cryptographic techniques. In one implementation, free space quantum transmitter 225 may distribute encryption key symbols by encoding each encryption key symbol value into the phase, polarization, or energy state of a transmitted photon. Free space quantum transmitter 225 may distribute encryption key symbols to land network nodes 135-1 through 135-N.

RF transceiver 230 may include any type of transceiver-like mechanism that enables satellite 125 to send and receive RF signals to and from other devices. For example, RF transceiver 230 may include mechanisms for communicating with key management system 130 via an RF link, or with land network nodes 135-1 through 135-N via RF links.

Satellite 125 may perform certain operations or processes, as will be described in detail below. Satellite 125 may perform these operations in response to processing unit 205 executing software instructions contained in a computer-readable medium, such as memory 210. A computer-readable medium may be defined as a physical or logical memory device and/or carrier wave.

The software instructions may be read into memory 205 from another computer-readable medium, or from another device via RF transceiver 230. The software instructions contained in memory 210 may cause processing unit 205 to perform operations or processes that will be described later. Alternatively, hardwired circuitry may be used in place of or in combination with software instructions to implement processes described herein. Thus, implementations described herein are not limited to any specific combination of hardware circuitry and software. Bus 210 may include a path that permits communication among the elements of satellite 125.

Figure 3:
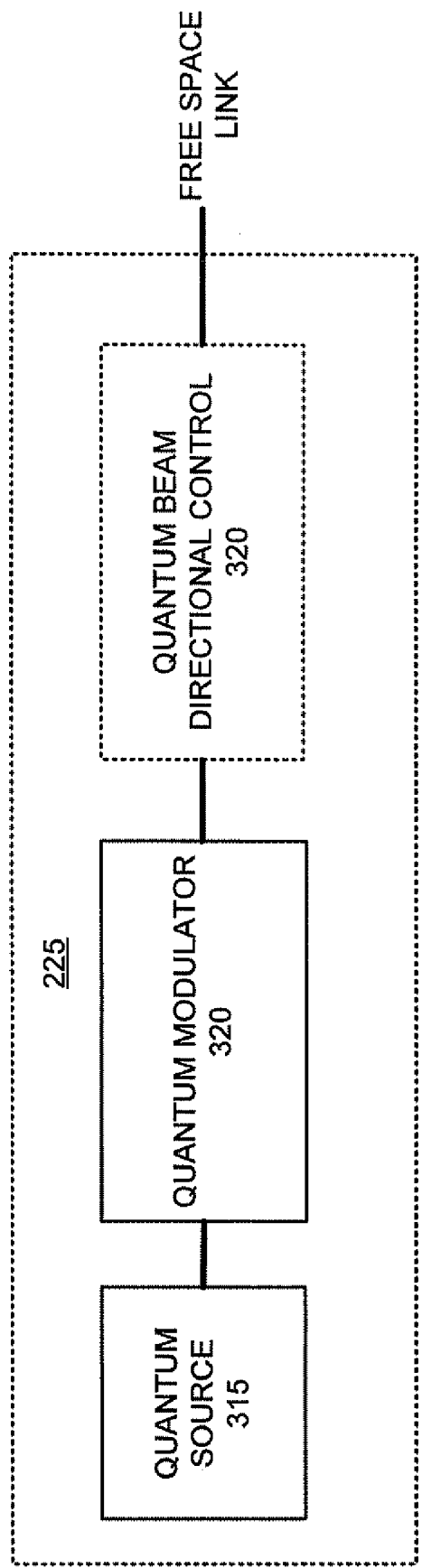
FIG. 3 is an exemplary diagram of a free space quantum transmitter of the satellite of FIG. 2.

FIG. 3 is an exemplary diagram of free space quantum transmitter 225 of satellite 125. As shown in FIG. 3, free space quantum transmitter 225 may include a quantum source 315, a quantum modulator 320 and an optional quantum beam directional control unit 320. Quantum source 315 may emit quantum particles, such as, for example, photons. In one implementation, quantum source 315 may include a photon source such as, for example, a laser. Quantum modulator 320 may modulate a state of each quantum particle emitted by quantum source 315 to encode each quantum particle with an encryption key symbol value. In one implementation, quantum modulator 320 may modulate the phase/polarization and/or energy of emitted photons. For example, quantum modulator 320 may include a Mach-Zehnder interferometer that may modulate the phase of emitted photons to encode each photon with an encryption key symbol value. Quantum beam directional control 320 may include control circuitry and associated mechanical components for directing a beam of quantum particles (e.g., photons) emitted from quantum source 315 towards one or more of nodes 135. Directional control 320 may, thus, permit satellite 125 to aim its beam of quantum particles towards selected nodes 135 of land network 120. In one implementation, satellite 125 may include multiple free space quantum transmitters 225, with each being capable of being independently directed (e.g., aimed) to provide a beam of quantum particles to different ones of nodes 135. Free space quantum transmitter 225 may distribute encryption key symbols to one or more land network nodes 135-1 through 135-N via a free space link.

Figure 4:
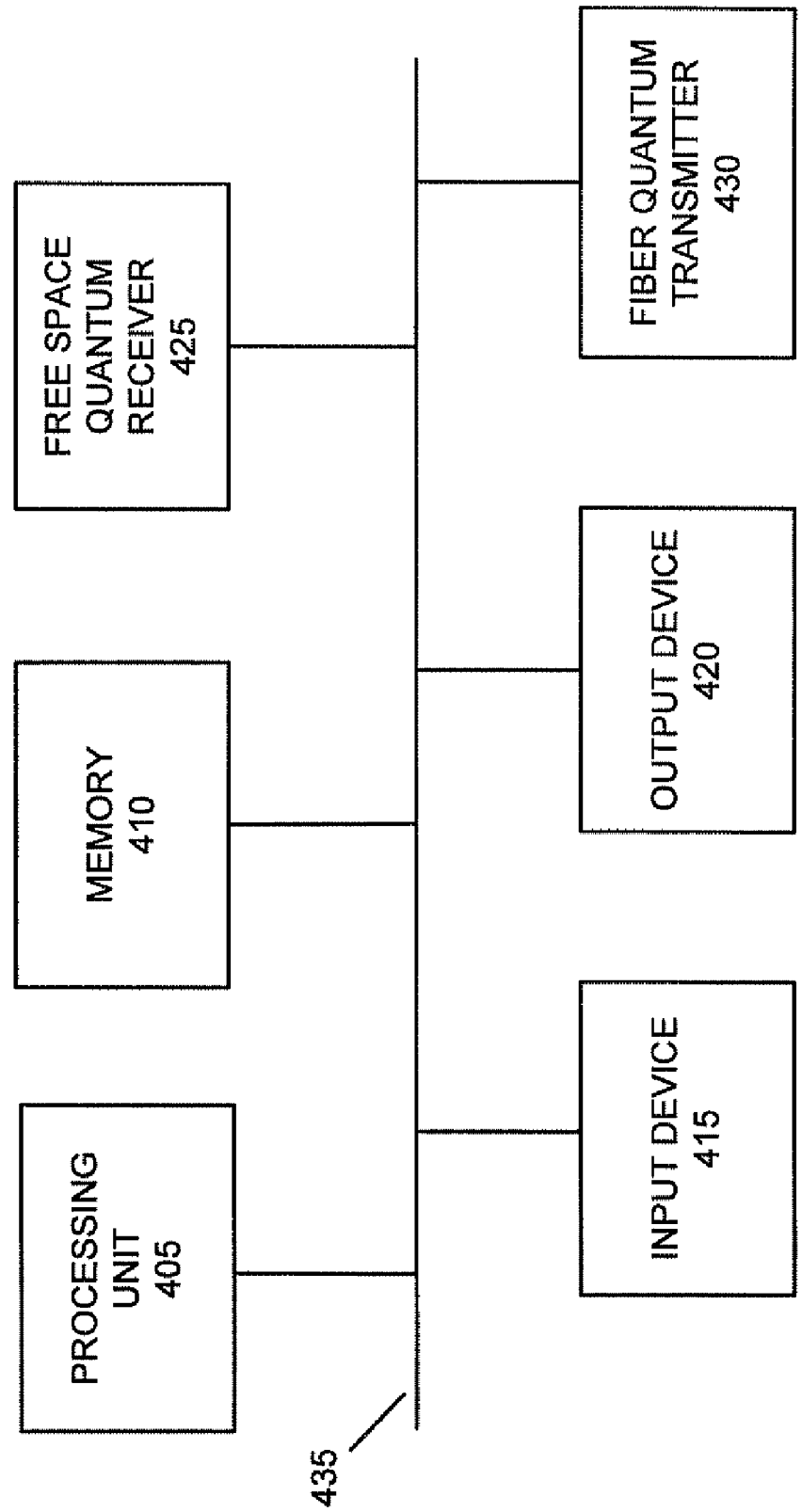
FIG. 4 is an exemplary diagram of a node of the land network of FIG. 1.

FIG. 4 is an exemplary diagram of a land network node 135 consistent with exemplary embodiments. Node 135 may include a processing unit 405, a memory 410, an input device 415, an output device 420, a free space quantum receiver 425, a fiber quantum transmitter 430 and a bus 435. Processing unit 405 may include a processor, microprocessor, or processing logic that may interpret and execute instructions. Memory 410 may include a RAM or another type of dynamic storage device that may store information and instructions for execution by processing unit 205. Memory 410 may further include a ROM device or another type of static storage device that may store static information and instructions for use by processing unit 405. Node 135 may also include a quantum receiver (not shown) that is similar to quantum receiver 710 described below with respect to FIG. 7.

Input device 415 may include a mechanism that permits an operator to input information to network node 135, such as, for example, a keypad or a keyboard. Output device 420 may include a mechanism that outputs information to a node operator such as, for example, a display. Free space quantum receiver 425 may include mechanisms for receiving encryption key symbols distributed via a free space link from satellite 125 using quantum cryptographic techniques. Fiber quantum transmitter 430 may include mechanisms for re-transmitting the received encryption key symbols via a fiber link to a local node 140 using quantum cryptographic techniques. Bus 435 may include a path that permits communication among the elements of network node 135.

Figure 5A:
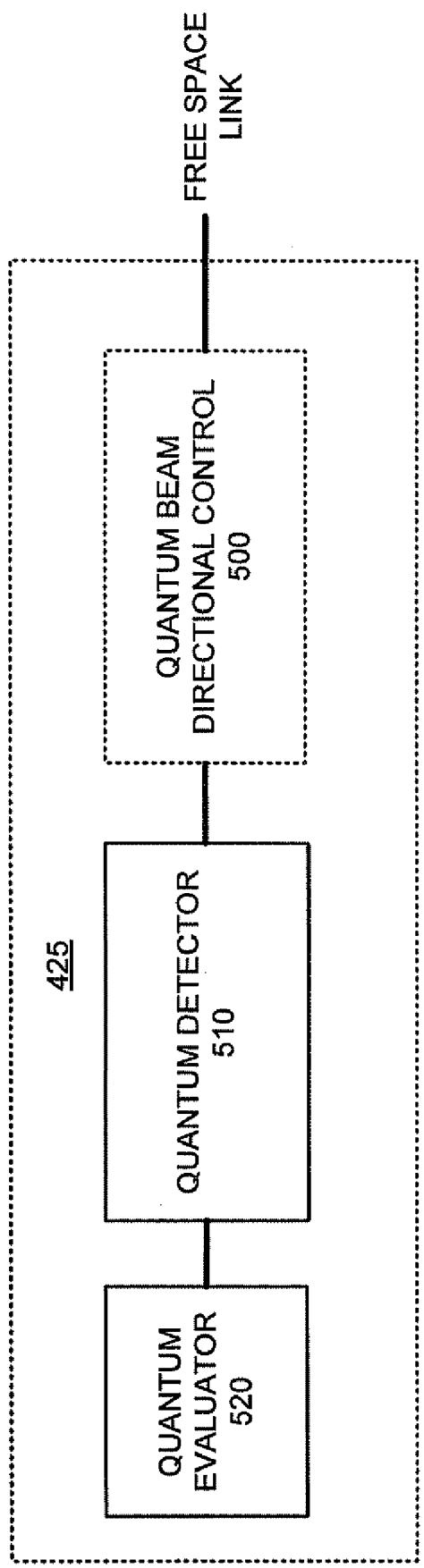
FIG. 5A is an exemplary diagram of a free space quantum receiver of the node of FIG. 4.

FIG. 5A is an exemplary diagram of free space quantum receiver 425 of land network node 135. Free space quantum receiver 425 may include an optional quantum beam directional control unit 500, a quantum detector 510 and a quantum evaluator 520. Quantum beam directional control unit 500 may include control circuitry and associated mechanical components for directing receiver 425 towards satellite 125 to receive a beam of quantum particles (e.g., photons). Directional control 320 may, thus, permit node 135 to aim its receiver towards selected satellites 125 of satellite network 110. Quantum detector 510 may include mechanisms for detecting a quantum state of quantum particles received from satellite 125. In one implementation, quantum detector 510 may include a photon detector, such as, for example, an avalanche photo detector (APDs) or a photo-multiplier tube (PMTs). Photon evaluator 330 may include circuitry for processing and evaluating output signals from quantum detector 510 in accordance with quantum cryptographic techniques.

Figure 5B:
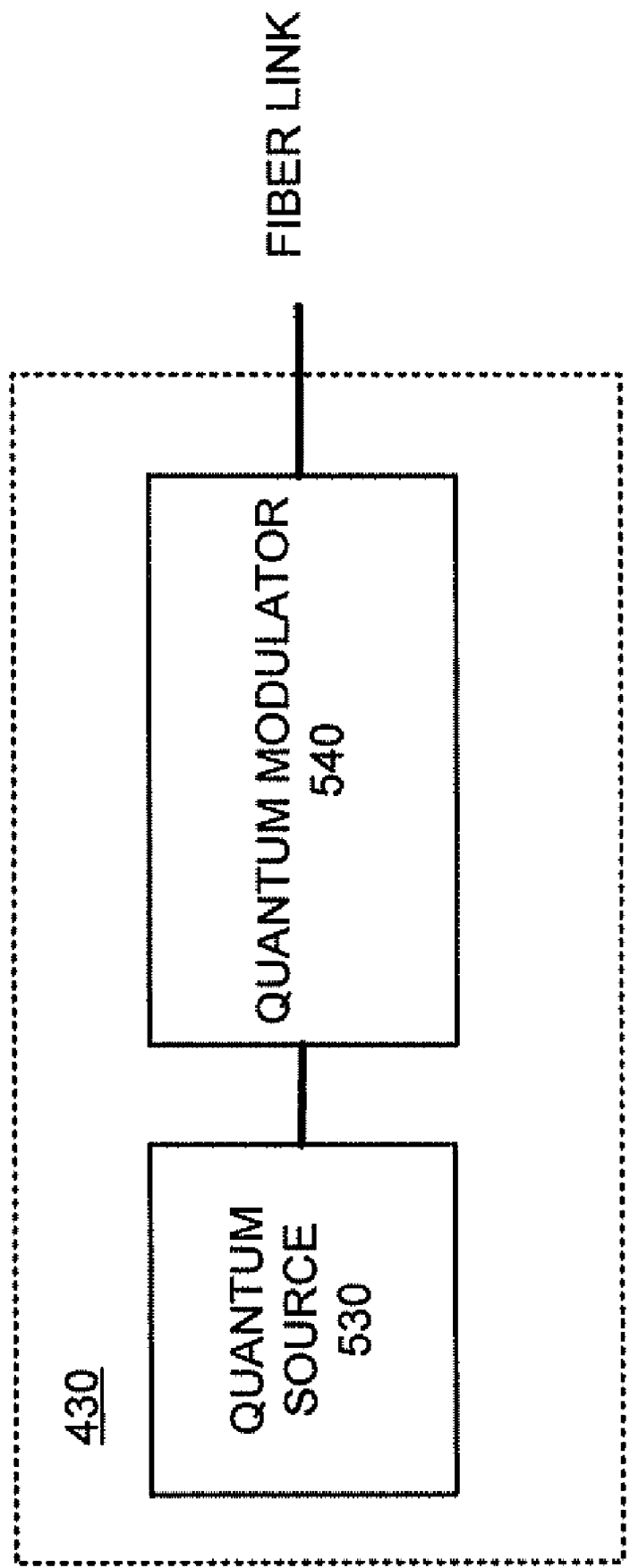
FIG. 5B is an exemplary diagram of a fiber quantum transmitter of the node of FIG. 4.

FIG. 5B is an exemplary diagram of fiber quantum transmitter 430 of network node 135. Fiber quantum transmitter 430 may include a quantum source 530 and a quantum modulator 540. Quantum source 530 may emit quantum particles, such as, for example, photons. In one implementation, quantum source 530 may include a photon source such as, for example, a laser. Quantum modulator 540 may modulate a state of each quantum particle emitted by quantum source 530 to encode each quantum particle with an encryption key symbol value. In one implementation, quantum modulator 540 may modulate the phase/polarization and/or energy of emitted photons. For example, quantum modulator 540 may include a Mach-Zehnder interferometer that may modulate the phase of emitted photons to encode each photon with an encryption key symbol value.

Figure 6:
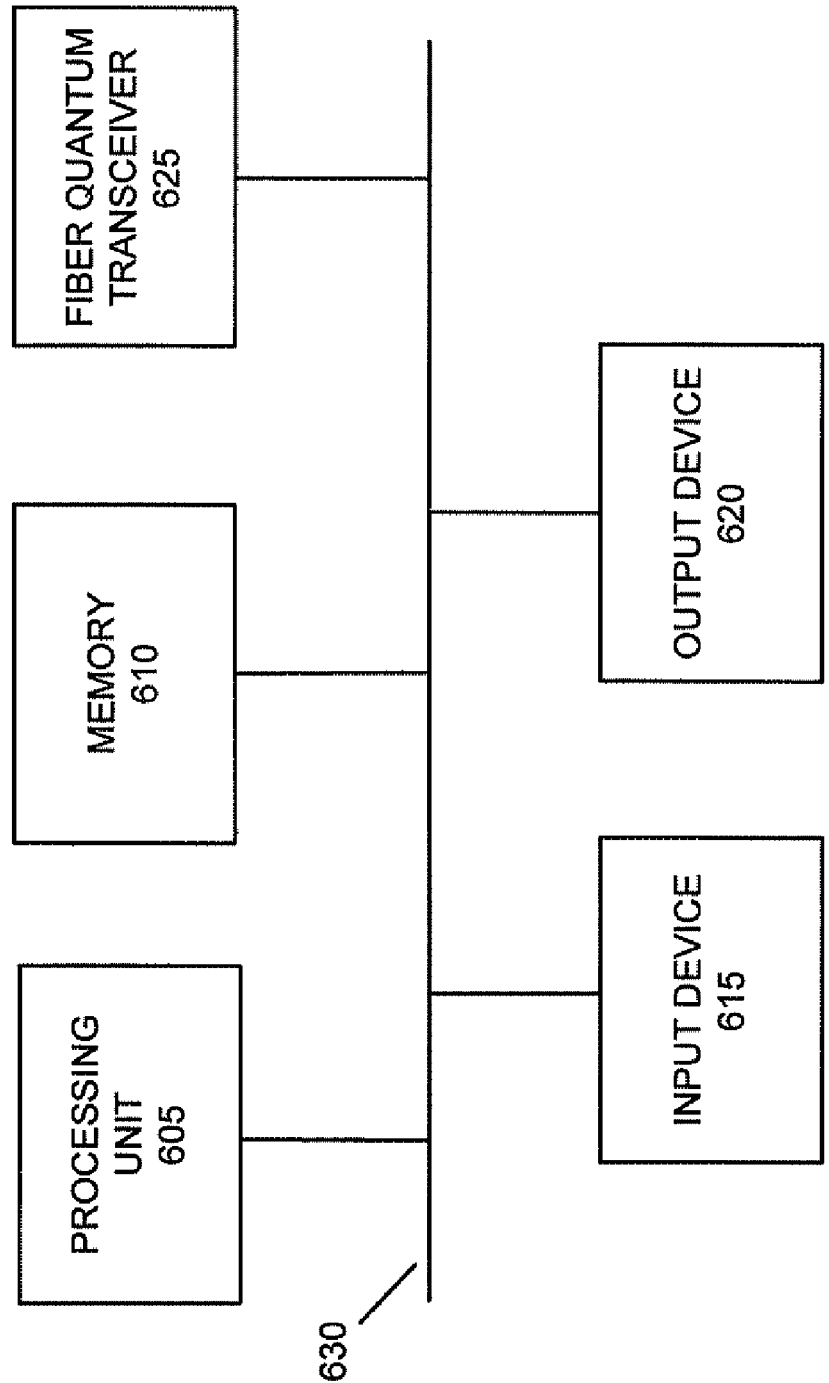
FIG. 6 is an exemplary diagram of a local node of FIG. 1.

FIG. 6 is an exemplary diagram of a local node 140 consistent with an exemplary embodiment. Local node 140 may include a processing unit 605, a memory 610, an input device 615, an output device 620 and a fiber quantum transceiver 625. Processing unit 605 may include a processor, microprocessor, or processing logic that may interpret and execute instructions. Memory 610 may include a RAM or another type of dynamic storage device that may store information and instructions for execution by processing unit 205. Memory 610 may further include a ROM device or another type of static storage device that may store static information and instructions for use by processing unit 605.

Input device 615 may include a mechanism that permits an operator to input information to local node 140, such as, for example, a keypad or a keyboard. Output device 620 may include a mechanism that outputs information to a node operator such as, for example, a display. Fiber quantum transceiver 625 may include mechanisms for receiving encryption key symbols distributed via a fiber link from a network node 135 using quantum cryptographic techniques and re-transmitting the received encryption key symbols to a customer site 150 via a fiber link using quantum cryptographic techniques. Bus 630 may include a path that permits communication among the elements of local node 140.

Figure 7:
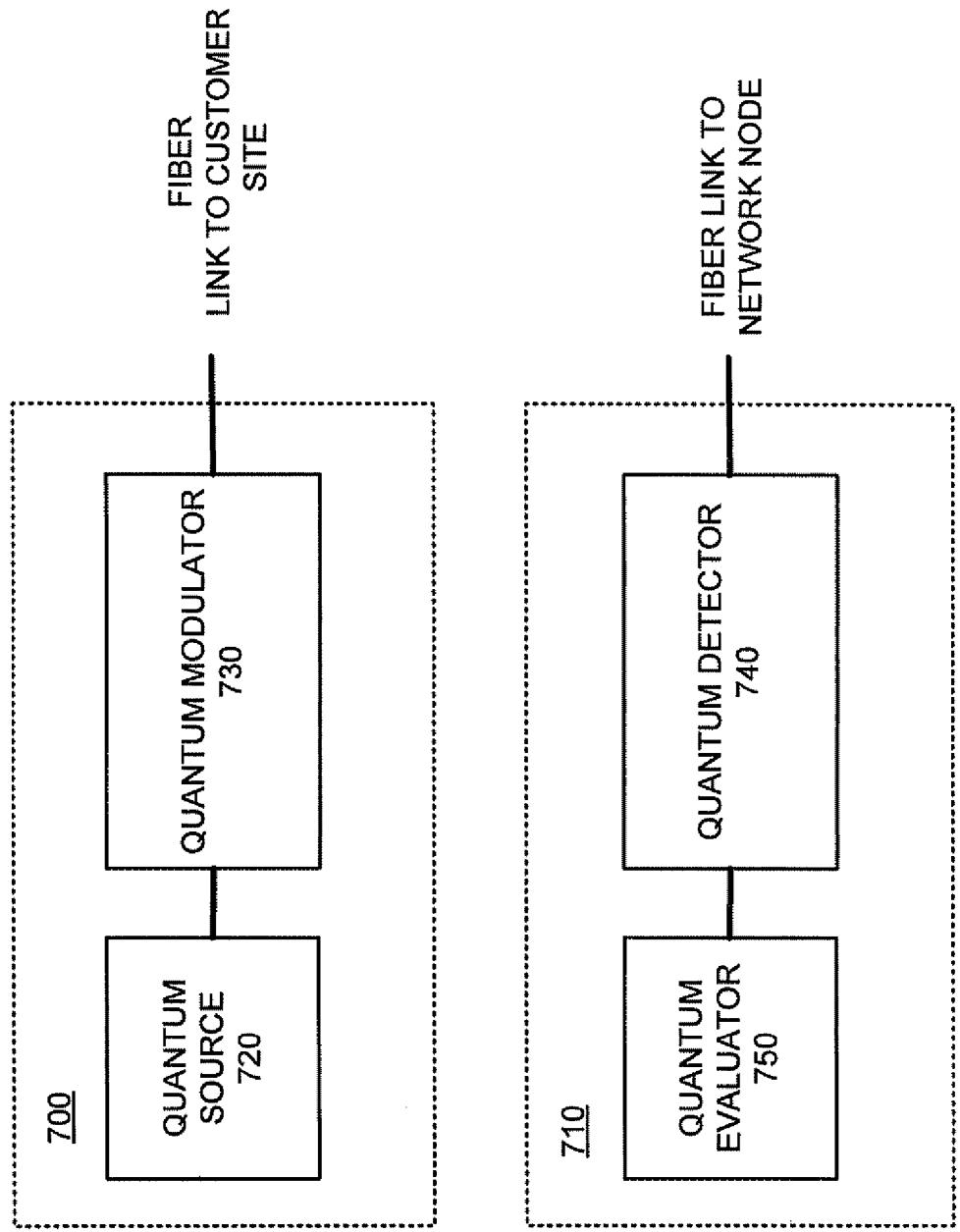
FIG. 7 is an exemplary diagram of the fiber quantum transceiver of the local node of FIG. 6.

FIG. 7 is an exemplary diagram of fiber quantum transceiver 625 of local node 140. Fiber quantum transceiver 625 may include a quantum transmitter 700 and a quantum receiver 710. Quantum transmitter 700 may include a quantum source 720 and a quantum modulator 730. Quantum receiver 710 may include a quantum detector 740 and a quantum evaluator 750.

Quantum source 720 may emit quantum particles, such as, for example, photons. In one implementation, quantum source 720 may include a photon source such as, for example, a laser. Quantum modulator 730 may modulate a state of each quantum particle emitted by quantum source 720 to encode each quantum particle with an encryption key symbol value. In one implementation, quantum modulator 730 may modulate the phase/polarization and/or energy of emitted photons. For example, quantum modulator 730 may include a Mach-Zehnder interferometer that may modulate the phase of emitted photons to encode each photon with an encryption key symbol value. Quantum detector 740 may include mechanisms for detecting a quantum state of quantum particles received from a network node 135. In one implementation, quantum detector 740 may include a photon detector, such as, for example, an APD or a PMT. Quantum evaluator 750 may include circuitry for processing and evaluating output signals from quantum detector 740 in accordance with quantum cryptographic techniques.

Figure 8:
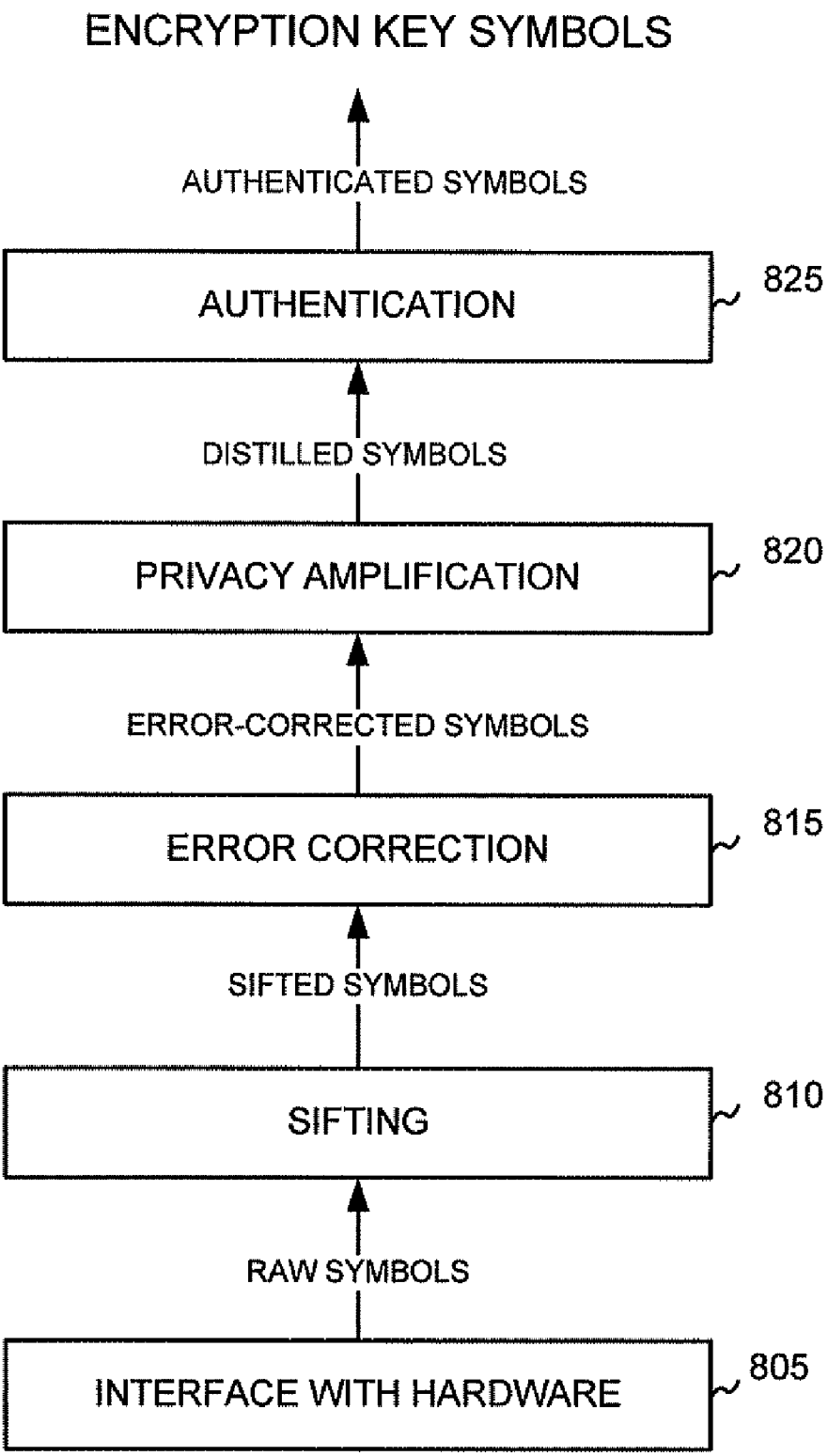
FIG. 8 illustrates a quantum key distribution (QKD) technique consistent with an exemplary embodiment of the invention.

FIG. 8 graphically illustrates a quantum key distribution (QKD) technique consistent with an exemplary embodiment of the invention. The exemplary technique illustrated in FIG. 8 is merely one example of quantum key distribution that may be used in an exemplary embodiment. Other known quantum key distribution techniques may alternatively be used. Quantum key distribution, according to an exemplary embodiment, may include interface with hardware operations 805, sifting operations 810, error correction operations 815, privacy amplification operations 820 and authentication operations 825. The interface with hardware operations 805 may include operations and/or protocols for deriving symbol values from transmitted photons. Values of the QKD symbols (e.g., high or low symbol values) may be interpreted by the polarization, phase or energy states of incoming photons. The polarization, phase or energy state of each received photon may be measured and interpreted to identify a symbol value for each received photon.

Sifting operation 810 may implement protocols for discarding or "sifting" certain of the raw symbols produced by interface with hardware operations 805. The protocols of sifting operations 810 may exchange basis information between the entities to a QKD symbol exchange. As an example, when a network node 135 receives polarized photons from satellite 125, network node 135 may measure the polarization of each photon along either a rectilinear or diagonal basis with equal probability. Network node 135 records the basis that is used for measuring the polarization of each photon. Network node 135 may then inform satellite 125, via the protocols of sifting operations 810, the basis it has chosen for measuring the polarization of each photon. Satellite 125 may then, via the protocols of sifting operations 810 inform network node 135, whether it has made the polarization measurement along the correct basis. Satellite 125 and network node 135 may then "sift" or discard all polarization measurements in which network node 135 has made the measurement along the wrong basis and keep only the measurements in which network node 135 has made the measurement along the correct basis. For example, if satellite 125 transmits a photon with a symbol encoded as a 0° polarization and if network node 135 measures the received photon via a diagonal basis (45°-135°), then satellite 125 and network node 135 will discard this symbol value since network node 135 has made the measurement along the incorrect basis.

Error correction operations 815 may implement protocols for correcting errors that may be induced in transmitted photons due to, for example, the intrinsic noise of the quantum channel. Error correction operations 815 may implement parity or cascade checking, convolutional encoding or other known error correction processes. The error correction operations 815 may additionally implement protocols for determining whether eavesdropping has occurred on the quantum channel. Errors in the states (e.g., polarization, phase or energy) of received photons may occur if an eavesdropper is eavesdropping on the quantum channel. To determine whether eavesdropping has occurred during transmission of a sequence of photons, satellite 125 and network node 135, for example, may choose randomly a subset of photons from the sequence of photons that have been transmitted and measured on the same basis. For each of the photons of the chosen subset, network node 135 may publicly announce its measurement result. Satellite 125 may then inform network node 135 whether its result is the same as what satellite 125 originally sent. Satellite 125 and network node 135 both may then compute the error rate of the subset of photons. If the computed error rate is higher than an agreed upon tolerable error rate (typically about 15%), then satellite 125 and network node 135 may infer that substantial eavesdropping has occurred. They may then discard the current polarization data and start over with a new sequence of photons.

Privacy amplification operations 820 may implement protocols for reducing error-corrected symbols received from the error correction operations 815 to a small set of derived symbols (e.g., bits) to reduce a potential eavesdropper's knowledge of the key. If, subsequent, to sifting and error correction, satellite 125 and network node 135 have adopted n symbols as secret symbols, then privacy amplification operations 820 may compress the n symbols using, for example, a hash function. Satellite 125 and network node 135 may agree upon a publicly chosen hash function f and take K=f(n symbols) as the shared r-symbol length key K. The hash function randomly redistributes the n symbols such that a small change in symbols produces a large change in the hash value. Thus, even if an eavesdropper determines a number of symbols of the transmitted key through eavesdropping, and also knows the hash function f, the eavesdropper still will be left with very little knowledge regarding the content of the hashed r-symbols key K.

Authentication operations 825 may implement protocols for authenticating transmissions between QKD endpoints (e.g., between satellite 125 and network node 135). Such protocols may include any known authentication mechanisms (e.g., message authentication codes (MACs)).

Figure 9:
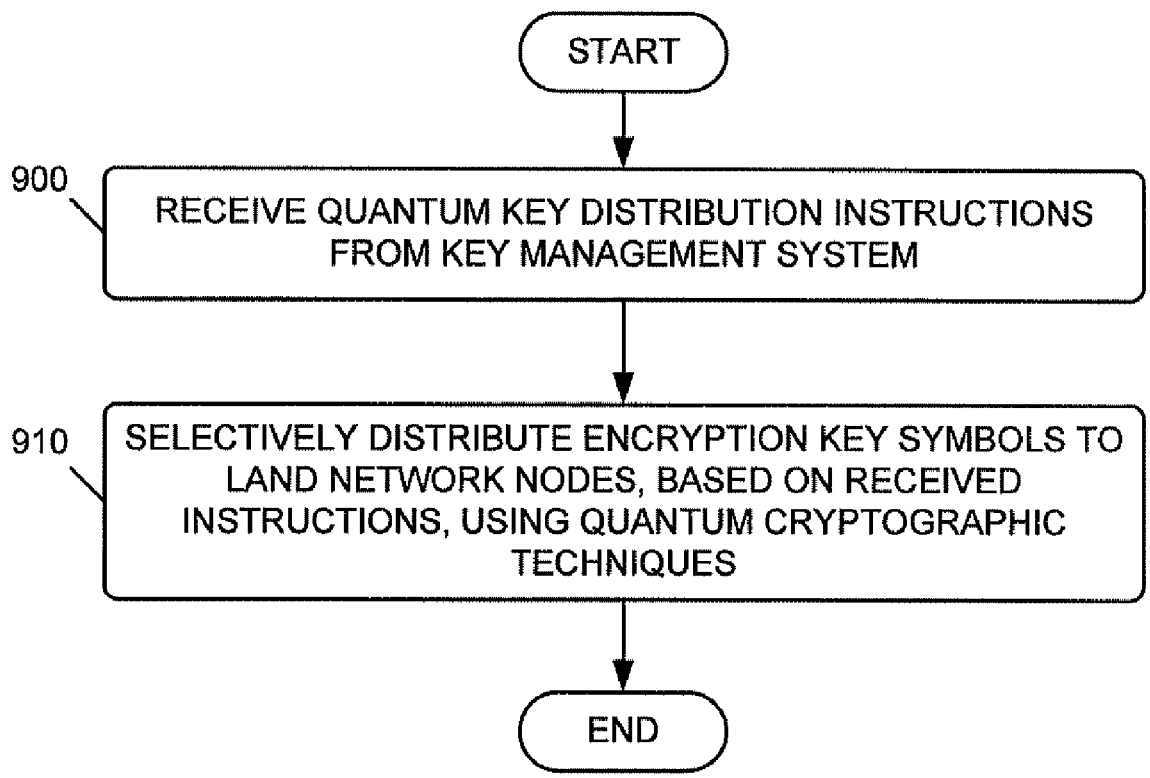
FIG. 9 is a flowchart of an exemplary process for distributing keys from a satellite network to a land network.
Figure 10A:
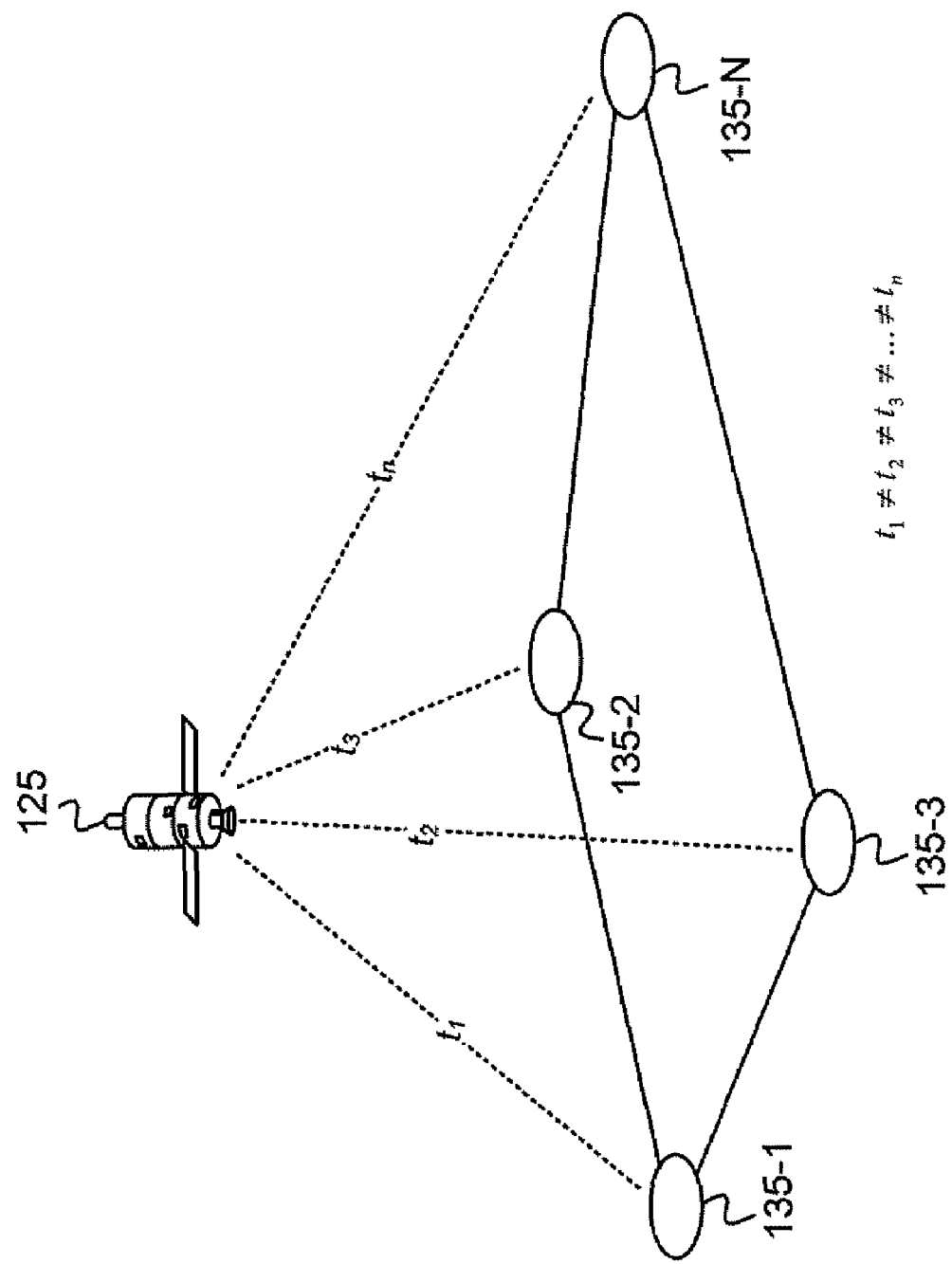
FIGS. 10A and 10B graphically illustrate key distribution from a satellite network to a land network.
Figure 10B:
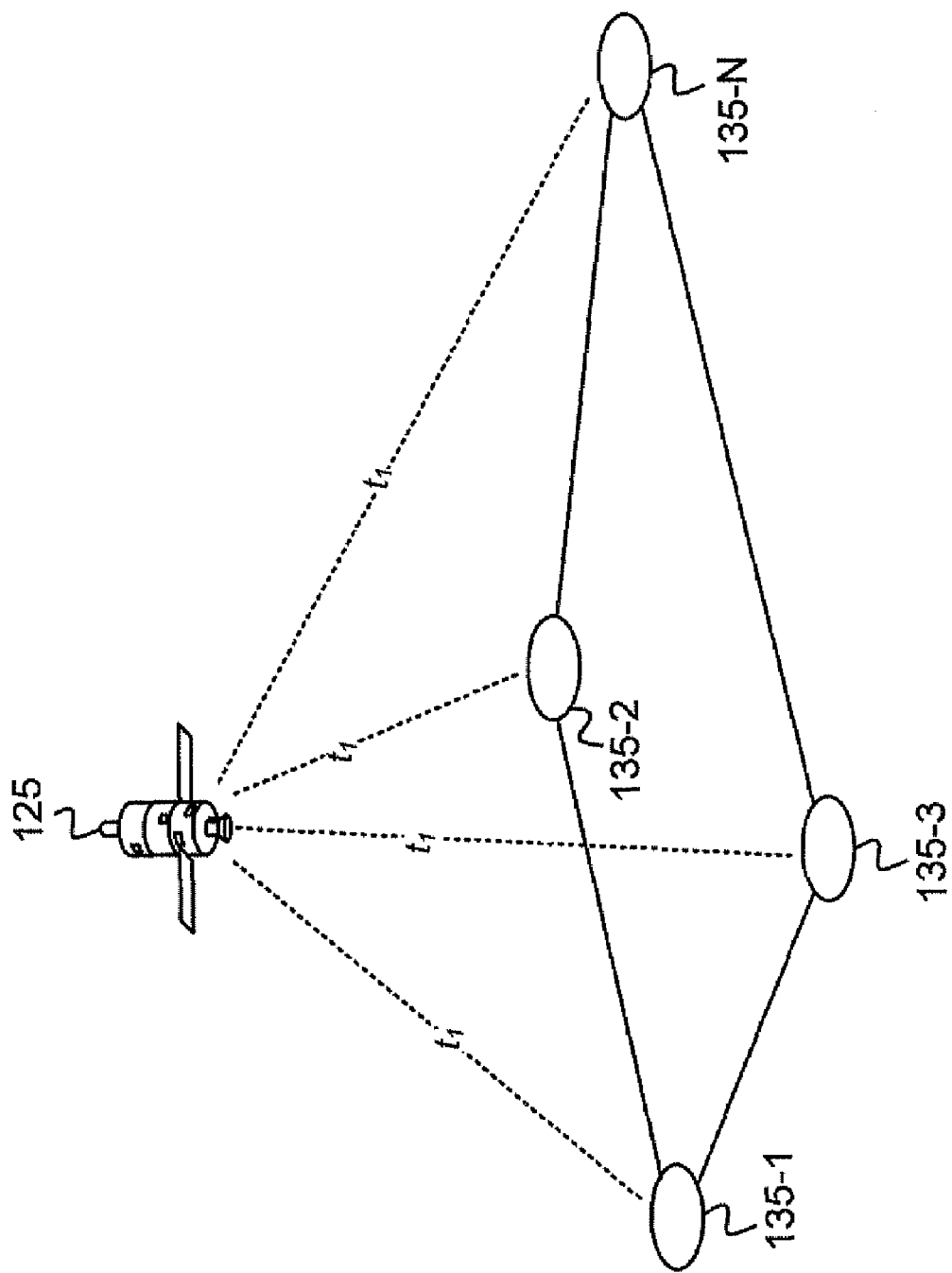

FIG. 9 is a flowchart of an exemplary process for distributing keys from a satellite network to a land network. The process exemplified by FIG. 9 may be performed by satellite 125. The exemplary process may begin with the receipt of quantum key distribution instructions from key management system 130 (block 900). The distribution instructions may identify an algorithm that may be used by satellite 125 for generating encryption key symbols, or may identify a set of encryption key symbols already stored at satellite 125 that may be retrieved for distribution. The distribution instructions may also identify specific ones of network nodes 135-1 through 135-N to which satellite 125 should distribute encryption key symbols using quantum cryptographic techniques. Encryption key symbols may then be selectively distributed to nodes of land network 120, based on the received instructions, using quantum cryptographic techniques (block 910). Satellite 125 may carry out the exemplary QKD operations, described above with respect to FIG. 8, for distributing the encryption key symbols to one or more nodes 135 of land network 120. Free space quantum transmitter 225 of satellite 125 may be used for distributing the encryption key symbols to the one or more nodes 135 of land network 120. FIG. 10A illustrates one exemplary implementation in which the encryption key symbols are distributed by satellite 125 using time sharing or Time Division Multiple Access (TDMA). As shown in FIG. 10A, each network node 135-1 through 135-N may receive distributed encryption key symbols at different times $t_1, t_2, t_3 \ldots t_n$. FIG. 10B illustrates another exemplary implementation in which the encryption key symbols are distributed by satellite 125 to each network node 135-1 through 135-N at a same time $t_1$. In this implementation, satellite 125 may include multiple free space quantum transmitters 225 for distributing the encryption key symbols to respective nodes 135-1 through 135-N.

Figure 11:
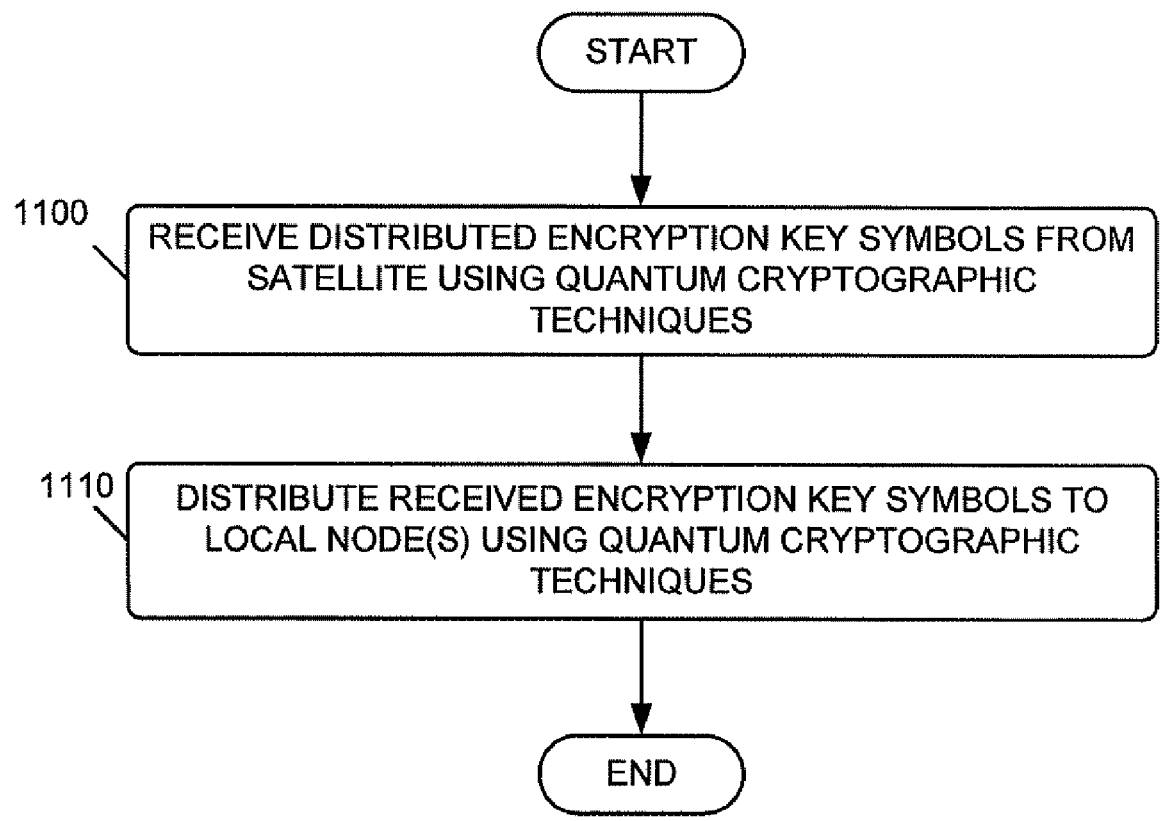
FIG. 11 is a flowchart of an exemplary process for receiving distributed keys at a land network node and further distributing the keys to local nodes.

FIG. 11 is a flowchart of an exemplary process for receiving distributed keys at a land network node 135 and further distributing the keys to local nodes 140. The process exemplified by FIG. 11 may be performed by a network node 135. The exemplary process may begin with the receipt of encryption key symbols distributed from satellite 125 using quantum cryptographic techniques (block 1100). Free space quantum receiver 425 of network node 135 may receive the distributed encryption key symbols from satellite 125 via a free space link. Network node 135 may further distribute the received encryption key symbols to a local node 140 using quantum cryptographic techniques (block 1110). Fiber quantum transmitter 430 may re-transmit the received encryption key symbols to a respective local node 140 using the exemplary quantum cryptographic key distribution technique described above with respect to FIG. 8.

Figure 12:
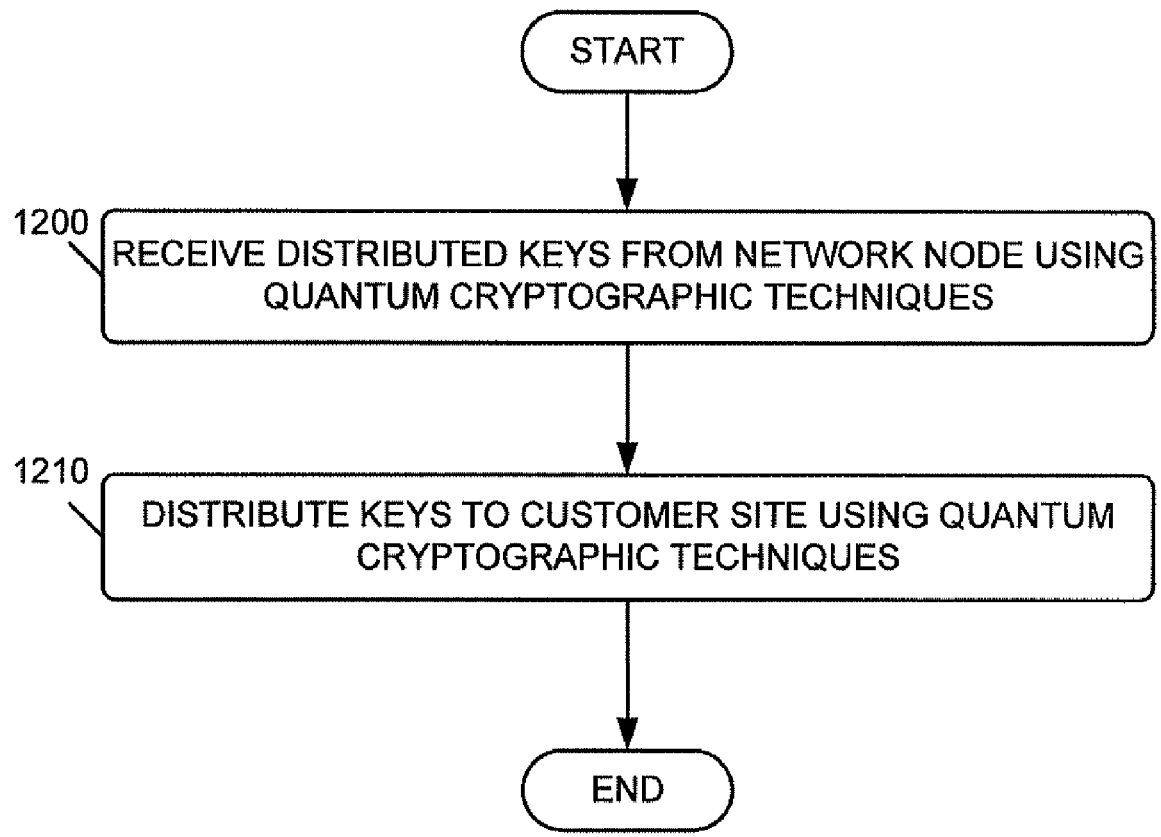
FIG. 12 is a flowchart of an exemplary process for receiving distributed keys from a land network node at a local node and further distributing the keys to a customer site.

FIG. 12 is a flowchart of an exemplary process for receiving distributed keys from a land network node at a local node and further distributing the keys to a customer site. The process exemplified by FIG. 12 may be performed by a local node 140. The exemplary process may begin with the receipt of encryption key symbols distributed from a network node 135 at a local node 140 using quantum cryptographic techniques (block 1200). Quantum receiver 710 of local node 140 may receive the encryption key symbols distributed from a respective network node 135 via a fiber link.

Local node 140 may further distribute the received encryption key symbols to a customer site using quantum cryptographic techniques (block 1210). Quantum transmitter 700 of local node 140 may re-transmit the encryption key symbols to a customer site 150 via a fiber link.

Figure 13:
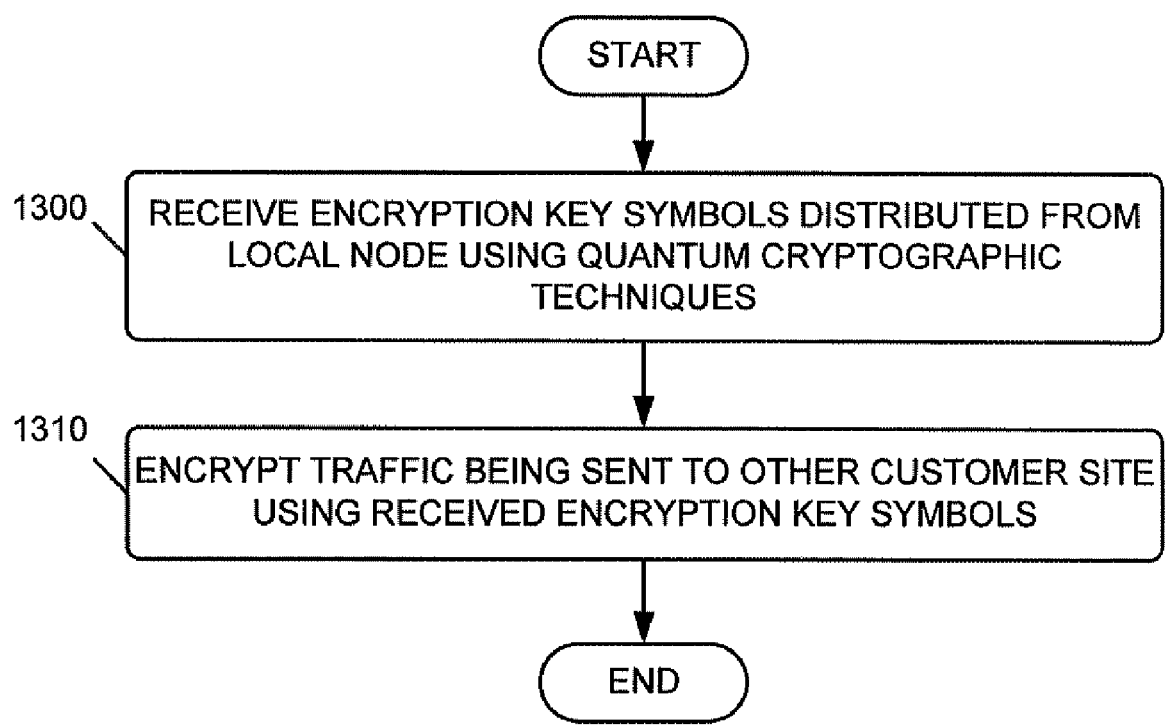
FIG. 13 is a flowchart of an exemplary process for receiving distributed keys from a local node at a customer site and encrypting traffic sent to another customer site using the received keys.

FIG. 13 is a flowchart of an exemplary process for receiving distributed key symbols from a local node at a customer site and encrypting traffic sent to another customer site using the received key symbols. The process exemplified by FIG. 13 may be performed by a customer site 150.

The exemplary process may begin with the receipt of encryption key symbols distributed from a local node 140 using quantum cryptographic techniques (block 1300). Customer site 150 may use a quantum receiver, similar to quantum receiver 710 described above with respect to local node 140, to receive encryption key symbols distributed using quantum cryptographic techniques. The quantum receiver may, for example, use the exemplary quantum key distribution operations described above with respect to FIG. 8.

Customer site 150 may encrypt traffic being sent to other customer sites using the received encryption key symbols (block 1310). For example, customer site 150-1 may encrypt traffic being sent to customer site 150-2 using distributed encryption key symbols received from local node 140-1. Any known encryption algorithm, that uses encryption keys, may be used for encrypting traffic sent from customer site 150 to another customer site (e.g., from customer site 150-1 to customer site 150-2).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while a series of acts has been described with regard to FIGS. 9 and 11-13, the order of the acts may be modified in other implementations consistent with the principles of the invention. Further, non-dependent acts may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    obtaining, at a first satellite, first encryption key symbols, by at least one of generating the first encryption key symbols at the first satellite in response to key distribution instructions or retrieving the first encryption key symbols stored at the first satellite in response to the key distribution instructions;
    receiving, at a first land-based node, the first encryption key symbols transmitted from the first satellite across a first free-space link using first quantum cryptographic techniques;
    receiving, at a second land-based node, second encryption key symbols transmitted from a second satellite across a second free-space link using second quantum cryptographic techniques;
    distributing the first encryption key symbols from the first land-based node towards a first customer site using third quantum cryptographic techniques; and
    distributing the second encryption key symbols from the second land-based node towards a second customer site using fourth quantum cryptographic techniques, where the first and second encryption key symbols are used for encrypting traffic sent between the first and second customer sites.

2. The method of claim 1, where the first encryption key symbols and the second encryption key symbols are the same encryption key symbols.

3. The method of claim 1, where the first and second satellites are the same satellite.

4. The method of claim 1, where the first and second satellites are space-based satellites.

5. The method of claim 1, where the first and second quantum cryptographic techniques are the same quantum cryptographic technique.

6. A system, comprising:
    means for obtaining, at a first satellite, first encryption key symbols, by at least one of generating the first encryption key symbols at the first satellite in response to key distribution instructions or retrieving the first encryption key symbols stored at the first satellite in response to the key distribution instructions;
    means for receiving, at a first land-based node, the first encryption key symbols transmitted from the first satellite across a first free-space link using first quantum cryptographic techniques;
    means for receiving, at a second land-based node, second encryption key symbols transmitted from a second satellite across a second free-space link using second quantum cryptographic techniques;
    means for distributing the first encryption key symbols from the first land-based node towards a first customer site using third quantum cryptographic techniques; and
    means for distributing the second encryption key symbols from the second land-based node towards a second customer site using fourth quantum cryptographic techniques, where the first and second encryption key symbols are used for encrypting traffic sent between the first and second customer sites.

7. The system of claim 6, where the first encryption key symbols and the second encryption key symbols are the same encryption key symbols.

8. The system of claim 6, where the first and second satellites are the same satellite.

9. The system of claim 6, where the first and second satellites are space-based satellites.

10. The system of claim 6, where the first and second quantum cryptographic techniques are the same quantum cryptographic technique.

11. A system, comprising:
    a first satellite to:
        receive key distribution instructions, and
        obtain, in response to the key distribution instructions, first encryption key symbols, where, when obtaining the first encryption key symbols, the first satellite at least one of:
            generates the first encryption key symbols at the first satellite in response to key distribution instructions, or
            retrieves the first encryption key symbols stored at the first satellite;
    a first land-based node to:

receive the first encryption key symbols transmitted from the first satellite across a first free-space link using first quantum cryptographic techniques, and distribute the first encryption key symbols from the first land-based node towards a first customer site using third quantum cryptographic techniques; and a second land-based node to:

receive second encryption key symbols transmitted from a second satellite across a second free-space link using second quantum cryptographic techniques, and distribute the second encryption key symbols from the second land-based node towards a second customer site using fourth quantum cryptographic techniques, where the first and second encryption key symbols are used for encrypting traffic sent between the first and second customer sites.

12. The system of claim 11, where the first encryption key symbols and the second encryption key symbols are the same encryption key symbols.

13. The system of claim 11, where the first and second satellites are the same satellite.

14. The system of claim 11, where the first and second satellites are space-based satellites.

15. The system of claim 11, where the first and second quantum cryptographic techniques are the same quantum cryptographic technique.

* * * * *